No. 637,665. Patented Nov. 21, 1899.
G. F. REED.
MOTOR VEHICLE.
(Application filed Aug. 2, 1899.)
(No Model.)
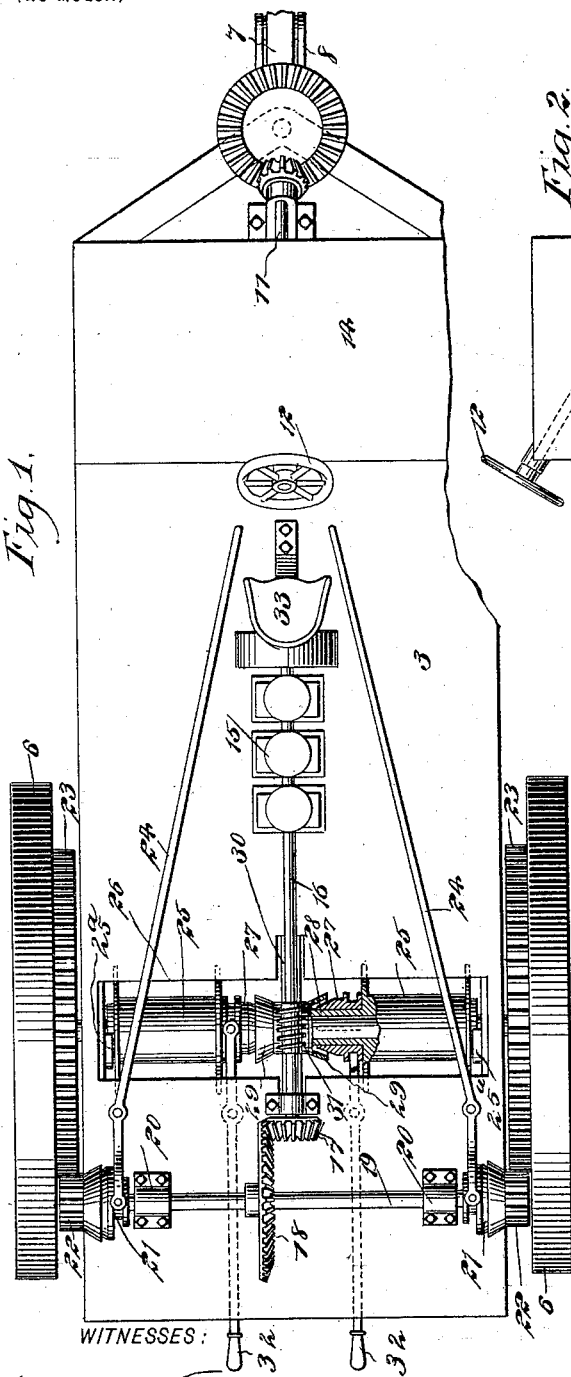
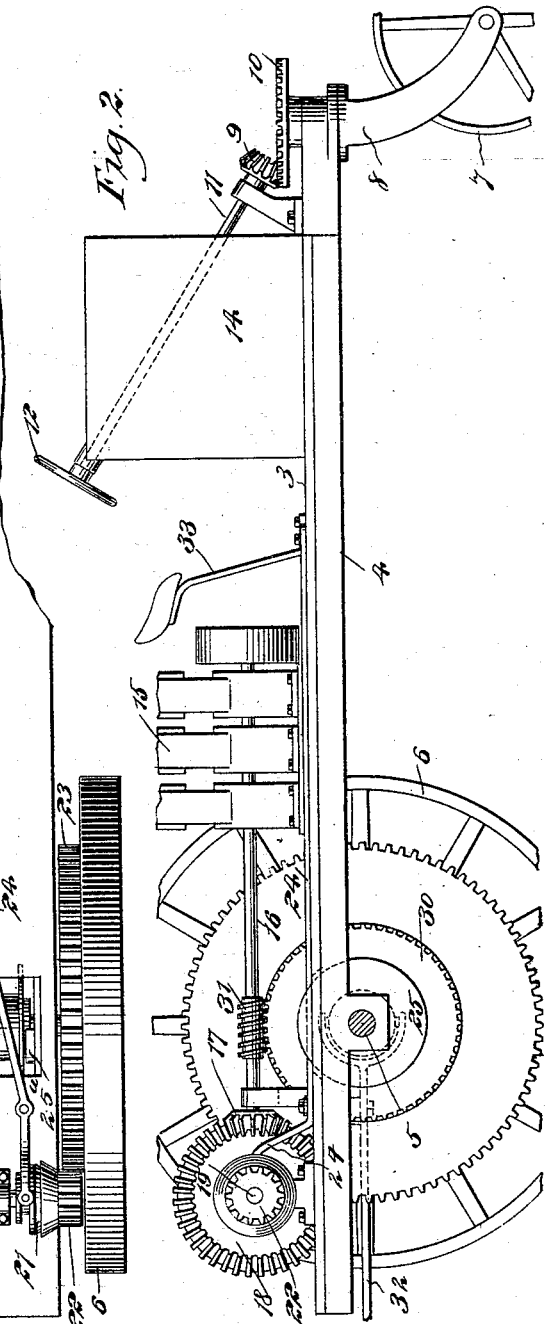
WITNESSES:
Edward Thorpe
Isaac B. Owens
INVENTOR
G. F. Reed
BY
Munn & Co.
ATTORNEYS
THE NORRIS PETERS CO., PHOTO-LITHO., WASHINGTON, D. C.

UNITED STATES PATENT OFFICE.

GEORGE FRANCIS REED, OF WALDO, FLORIDA.

MOTOR-VEHICLE.

SPECIFICATION forming part of Letters Patent No. 637,665, dated November 21, 1899.

Application filed August 2, 1899. Serial No. 725,384. (No model.)

*To all whom it may concern:*

Be it known that I, GEORGE FRANCIS REED, of Waldo, in the county of Alachua and State of Florida, have invented a new and Improved Motor-Vehicle, of which the following is a full, clear, and exact description.

This invention relates to an apparatus designed especially for hauling logs and like material; and it therefore embodies, in connection with the gearing for propelling the vehicle, a power-driven means for raising the logs or other material constituting the load in position to be transported.

This specification is the disclosure of one form of the invention and the claims define the actual scope thereof.

Reference is to be had to the accompanying drawings, forming a part of this specification, in which similar characters of reference indicate corresponding parts in both the figures.

Figure 1 is a plan view of the invention with part of the framing broken away, and Fig. 2 is a side elevation thereof with the rear axle in section.

The motor-vehicle has a platform or body 3, which may be constructed in any desired manner, preferably by longitudinal beams 4, (one of which is shown in Fig. 2,) extending from front to rear of the body. The vehicle is provided at its rear with a stationary axle 5, on which are loosely mounted the traction-wheels 6, and the front of the vehicle is supported by a pilot or third wheel 7, carried in a turning fork 8, which may be operated by miter-gears 9 and 10, the former being connected with the steering-shaft 11, carrying a hand-wheel 12. It is preferred to use a gasolene-engine in a manner that will be hereinafter described, and should such an engine be employed the oil forming the fuel thereof may be kept in a tank 14, mounted at the front of the vehicle, and through which tank is passed the shaft 11, facilitating the diagonal disposition of the shaft, as shown.

The engine 15 is mounted on the platform or body 3 and should be securely braced in its position by suitable fastenings with the framing of the body. The engine-shaft 16 is extended rearward and provided at is rear extremity with a bevel-gear 17, which meshes with a similar gear 18, fast on a shaft 19, which is mounted to turn in bearings 20, carried on the vehicle-body, at the rear thereof. Clutch members 21 are splined on the shaft 19, respectively at the ends thereof, and work with corresponding clutch members attached to pinions 22, which are arranged loosely on the shaft 19. These pinions 22 mesh with spur-gears 23, forming parts of the traction-wheels 6. The clutch members 21 may be thrown by levers 24, mounted on the body of the vehicle and extended along the floor thereof forwardly to the vicinity of the tank 14, permitting the levers 24 to be thrown by the feet of the person driving the vehicle. It will be seen that when the clutch members 21 are thrown into gear the pinions 22 are driven with the shaft 19, and then by the action of the gears 23 the traction-wheels 6 are driven, and thus the vehicle is propelled.

The stationary axle 5 carries loosely two drums 25, which are located in an orifice 26, formed in the floor of the body of the vehicle, the orifice being transversely elongated, as shown. A clutch member 27 is mounted at the inner end of each drum 25, the drums being provided with hollow extensions 28, on which said clutch members are splined. A double-clutch member 29 is mounted loosely on the axle between the clutch members 27 and has a worm-gear 30 secured thereto, the gear being meshed with and driven by a worm 31, fast to the shaft 16, which shaft passes directly over the top of the worm-wheel 30 and double-clutch member 29. The clutch members 27 are respectively in connection with levers 32, which levers extend rearwardly below the platform of the machine and provide a means for throwing the clutch members 27 in and out of gear with the double-clutch member 29. The shaft 16 being driven by the engine, it will be seen that by the action of the clutch members 27, in connection with the double-clutch member 29, one or both of the drums 25 may be driven. These drums 25 are adapted to have chains or cables attached thereto, which chains or cables may be employed to rest and hold the logs or other objects to be transported by the vehicle, it being understood that the logs are drawn up beneath the platform or body 3 thereof. Dogs 25ª are mounted one at each outer end of the drums and work with ratchets on the drums to hold the same when the clutches are disengaged.

A seat 33 is mounted on the platform or body 3 just forward of the engine 15. The operator resting on the seat may control the pilot-wheel manually and the levers 24 may be controlled by the feet of the operator. The levers 32 are adapted to be thrown by a person standing at the side of the machine, it being understood that it will not be necessary to operate these levers 32 during the progressive movement of the apparatus.

Having thus fully described my invention, I claim as new and desire to secure by Letters Patent—

1. In a motor-vehicle, a wheel-supported platform, an engine on said platform and having driving connection with wheels thereof, a drum loosely mounted on said platform and provided with a slidable clutch member, and a clutch member gearing with the driving-shaft of the engine and adapted to be engaged by the slidable clutch member of the drum, as and for the purpose set forth.

2. In a motor-vehicle, the combination with a body or platform having a front wheel, of an axle mounted fast in the rear portion thereof, traction-wheels loose on the axle, a transverse shaft mounted on the platform, pinions loose on the shaft and meshed with the traction-wheels, clutch members splined on the shaft and serving to fasten the pinions to the same, a motor mounted on the platform, means for gearing the transverse shaft with the motor-shaft, a drum mounted on the stationary axle, and gearing for driving the drum from the engine-shaft, such gearing comprising a clutch device to control the drum.

3. The combination with a frame or platform, of a shaft mounted therein, a prime mover-shaft mounted on the frame, a worm carried thereby, a clutch member mounted loosely on the axle and comprising a worm-wheel meshed with the worm, a drum mounted loosely on the axle, and a moving clutch member having splined connection with the drum and movable to engage the first-named clutch member, whereby to control the drum.

4. In a motor-vehicle, the combination with a frame or platform having a front wheel, of traction-wheels mounted rearward thereof, a motor mounted on the platform, gearing for driving the traction-wheels from the motor, such gearing comprising clutches for connecting and disconnecting the traction-wheels and the motor, a drum mounted on the vehicle, and gearing for driving the drum from the motor, such gearing including a clutch for connecting and disconnecting the drum.

5. The combination with a frame or platform, of a shaft mounted stationarily therein, a double-clutch member loose on the shaft, a worm-wheel attached to the clutch member, a driven shaft, a worm attached thereto and meshing with the worm-wheel, two drums mounted on the shaft, and clutch members respectively having splined connection with the drums, the last-named clutch members serving to work with the double-clutch member to connect and disconnect the drums therewith.

GEORGE FRANCIS REED.

Witnesses:
L. N. TOWNSEND,
A. C. BECKHAM.